United States Patent
Andersen et al.

(10) Patent No.: US 8,235,536 B2
(45) Date of Patent: Aug. 7, 2012

(54) HIGH INTENSITY IMAGE PROJECTOR USING SECTIONAL MIRROR

(75) Inventors: Odd Ragnar Andersen, Gamle (NO); Kjell Einar Olsen, Gamle (NO); Sverre Lefsaker, Gamle (NO)

(73) Assignee: projectiondesign as (NO)

( * ) Notice: Subject to any disclaimer, the term of this patent is extended or adjusted under 35 U.S.C. 154(b) by 625 days.

(21) Appl. No.: 12/266,384

(22) Filed: Nov. 6, 2008

(65) Prior Publication Data
US 2010/0110390 A1 May 6, 2010

(51) Int. Cl.
*G03B 21/26* (2006.01)
(52) U.S. Cl. .......................................... 353/94; 362/245
(58) Field of Classification Search .............. 353/94; 362/245, 247, 235, 243, 241
See application file for complete search history.

(56) References Cited

U.S. PATENT DOCUMENTS

| | | | |
|---|---|---|---|
| 6,527,420 B1 * | 3/2003 | Chuang | 362/346 |
| 7,437,034 B2 * | 10/2008 | Gerets et al. | 385/36 |
| 7,530,712 B2 * | 5/2009 | Lin et al. | 362/247 |
| 2005/0013142 A1 * | 1/2005 | Andersen et al. | 362/583 |
| 2005/0185148 A1 * | 8/2005 | Davis et al. | 353/84 |

FOREIGN PATENT DOCUMENTS

| | | |
|---|---|---|
| EP | 1107611 A2 | 6/2001 |
| EP | 1538832 A2 | 6/2005 |
| GB | 2180051 A | 3/1987 |
| JP | 110096803 A | 4/1999 |
| WO | WO 00/60396 A1 | 10/2000 |

OTHER PUBLICATIONS

Search/Examination Report dated Dec. 12, 2009 from International Application No. PCT/EP2009/007913, 13 pages.

* cited by examiner

*Primary Examiner* — Que T Le
*Assistant Examiner* — Jerry Brooks
(74) *Attorney, Agent, or Firm* — Kilpatrick Townsend & Stockton LLP; David B. Raczkowski (57) ABSTRACT

Image projectors with increased light intensity and methods for providing brighter images are provided. Image projectors, described herein, can provide the brightness while still providing any or all of compactness, low power consumption, and long lifetime. To increase brightness, sectional mirrors are used to respectively compress the light from two light sources into a single pupil (e.g. an aperture) of an imaging device. The compression can be accomplished by regions (e.g. sections) of the mirror having different angles with respect to the pupil. Relatively little light may be lost in the compression since minima for a light intensity pattern from a light source may occur between the regions that reflect the light.

26 Claims, 7 Drawing Sheets

HIGH INTENSITY IMAGE PROJECTOR USING SECTIONAL MIRROR

CROSS-REFERENCES TO RELATED APPLICATIONS

This application is related to commonly owned U.S. Pat. No. 7,033,056 entitled "MULTI-LAMP ARRANGEMENT FOR OPTICAL SYSTEMS" by Odd Ragnar Andersen et al et al., filed May 2, 2003, the disclosure of which is incorporated by reference in its entirety.

BACKGROUND

The present invention relates to image projectors, and more specifically to image projectors having high intensity (brightness) and/or luminosity (total amount of light).

Most projection systems today uses ultra high pressure (UHP) lamps, e.g. Mercury arc lamps, with wattage from 120 W-350 W and a lifetime of typical 1500-4000 h. These projectors are compact and portable with brightness level of typical 1000-5000 lumens. Most of these projectors are single lamp solutions. These arc lamp projectors are typically for home or office use where the space is relatively small.

Projectors used for digital cinema, large venues, and for fixed installations have a typical brightness of 10,000-30,000 μm. These projectors typically use Xenon lamps with wattage range of 2-6 KW. However, a typical lifetime for a Xenon lamp is 500-1500 hours. Accordingly, the tradeoff is that the Xenon lamps have a shorter lifetime but a higher brightness (luminosity).

Thus, it is desirable to have projectors that use arc lamps to obtain a longer lifetime, that also provide the brightness of the Xenon lamps. Also, it may also be desirable to have Xenon projectors with even more brightness.

As previously mentioned, most of the image projectors use one lamp. To provide more brightness, image projectors do use multiple lamps. However, these lamps combine light from the multiple lamps in an inefficient manner. Typically, the light collection will be only typical 2 to 2.5 times a single lamp solution.

It is therefore desirable to multiple lamp systems that provide greater efficiency and brightness.

BRIEF SUMMARY

Embodiments of the present invention provide image projectors with increased light intensity (brightness) relative to known models using multiple light sources. For example, certain embodiments meet the needs for high brightness, while still providing any or all of compactness, low power consumption, and long lifetime. Regarding the increased brightness, embodiments of the present invention advantageously can produce flux levels that are 1.5 times or better than other known systems. This increase can reduce power consumption, material cost, and operating cost.

To increase brightness, embodiments use mirrors to respectively compress the light from two light sources into a single pupil (e.g. an aperture) of an imaging device. In one aspect, the light from one source is compressed into about half of the pupil. The compression is accomplished by regions (e.g. sections) of the mirror having different angles with respect to the pupil. In one embodiment, relatively little light is lost in the compression since steps, which are between the regions, occur where a light pattern from a light source is at a minimum node.

According to one exemplary embodiment, an image projection system is provided. Two sources each provide electromagnetic (EM) radiation in opposing directions. A first reflective surface reflects EM radiation from the first source. A second reflective surface reflects EM radiation from the second source. An imager has a pupil that receives the reflected EM radiation. The imager uses the received EM radiation to create an image.

A first half of the pupil receives reflected EM radiation from the first source, and a second half of the pupil receives reflected EM radiation from the second source. Each reflective surface includes a plurality of regions that are flat in at least one direction. A first region of each reflective surface has a smaller angle relative to a line perpendicular to the pupil than does a second region, which is farther from the pupil than the first region.

According to one exemplary embodiment, a method of creating an image is provided. Two sources (although more may be used) provide electromagnetic (EM) radiation in opposing directions. A first reflective surface reflects EM radiation from the first source to a first half of a pupil of an imager. A second reflective surface reflects EM radiation from the second source to a second half of the pupil. The imager uses the received EM radiation to create an image with the imager.

Each reflective surface includes a plurality of regions that are flat in at least one direction, for example, in a direction towards the pupil. A first region of each reflective surface has a smaller angle relative to a line perpendicular to the pupil than does a second region of each reflective surface, where each first region is closer to the pupil than each second region.

A better understanding of the nature and advantages of the present invention may be gained with reference to the following detailed description and the accompanying drawings.

DETAILED DESCRIPTION

Embodiments of the present invention provide image projectors with increased light intensity (brightness) relative to known models using multiple light sources. To increase brightness, embodiments use mirrors to respectively compress the light from two light sources into a single pupil (e.g. an aperture) of an imaging device.

In one embodiment, the light from each light source creates a node intensity light pattern, which is focused on a respective stepped mirror. In one aspect, the light received at a stepped mirror has the same f-number as an entrance pupil of an imager. Each stepped mirror can compress its received light to 50% of the entrance pupil. The light reflected from the stepped mirror will transmit into the optical system and focused on the imager.

Figure 1:
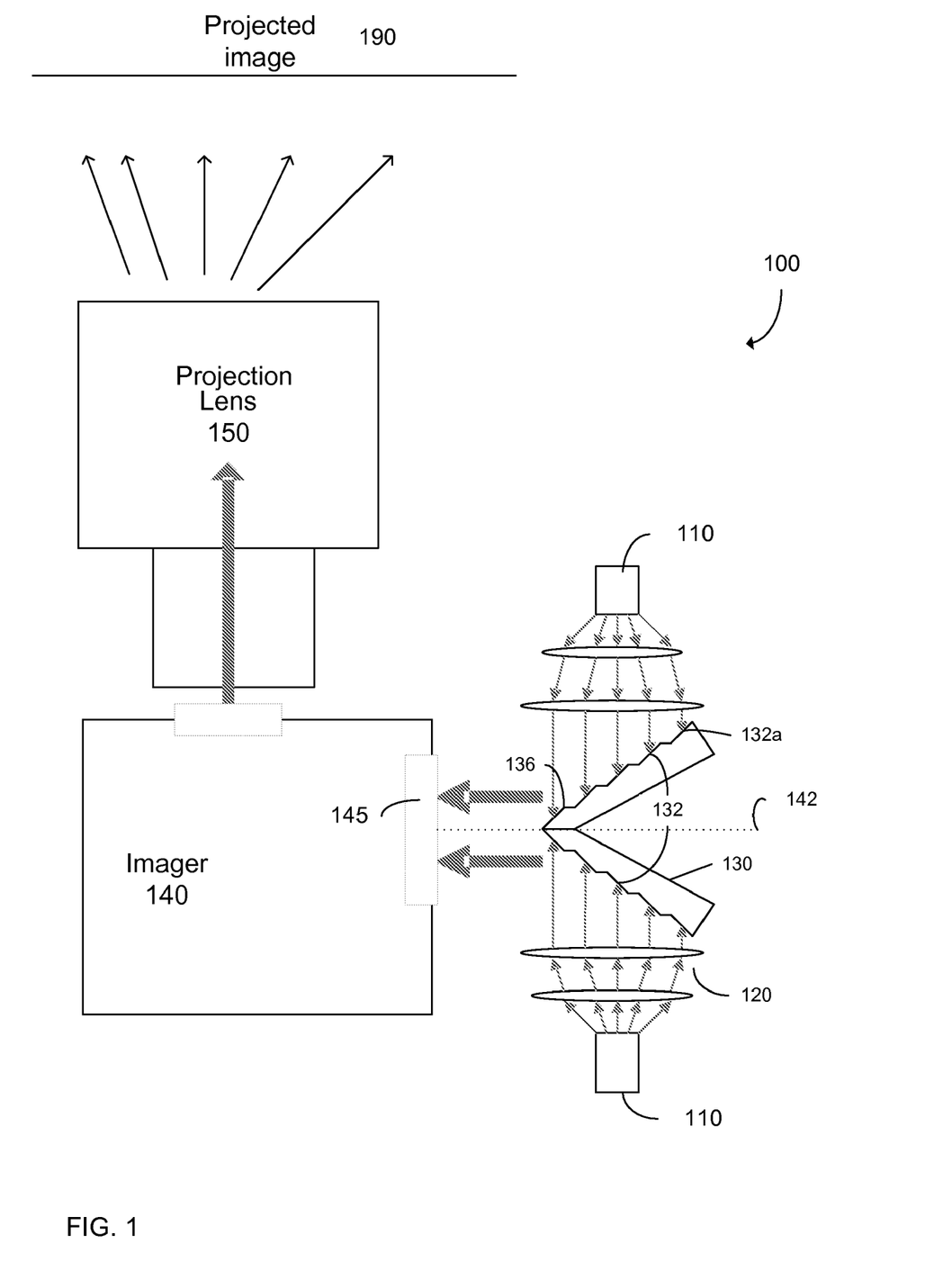
FIG. 1 is a schematic diagram of an image projector 100 according to an embodiment of the present invention.

FIG. 1 is a schematic diagram of an image projector 100 according to an embodiment of the present invention. Light from sources 110 is used to create an image, which is then displayed as projected image 190. Herein, light refers to any electromagnetic (EM) radiation, and not just to visible light. Herein, the two terms light and electromagnetic radiation are used interchangeably.

In one embodiment, the light sources 110 may include a single lamp or include any arrangement of multiple lamps (including the one shown), which produce light from electricity in any suitable manner known or to be developed. Although it is common to use UHP types of lamps for the light sources, embodiments may use any type of light sources, including light emitting diodes (LEDs) and lasers. In another embodiment, the light sources 110 are light emitting sources that do not produce light from electricity, such as from other EM radiation or fields, or thermal energy.

As shown, light sources 110 provide electromagnetic radiation in opposing directions. Herein, the term "opposing" means that some component of the lights rays from the respective sources 110 are provided in opposite directions. Here, the two opposite directions are up and down.

In one embodiment, light disperses from an outlet of a light source 110. The dispersed light is then collected into relay lenses 120. In one aspect, the relay lenses 120 have a diameter big enough to collect almost all (e.g. greater than 90%, and preferably greater than 955) of the light energy from the lamps 110, and focus the light onto a respective reflective surface 130.

Each reflective surface 130 has a sectional surface, for example, a stepped mirror surface. The surfaces 130 are reflective in that at least part of the surface is reflective. However, not every part of the surface is necessarily reflective. The parts that are reflective reflect almost all of the light, e.g., greater than 90% of the incident light, and preferably greater than 95% of the light.

The reflective light from the surfaces 130 is received by an imager 140 via a pupil 145. In one embodiment, the pupil is a simple opening. In another embodiment, the pupil is a transmissive object that allows light to pass through it, although the transmissive object may bend the light.

The reflective surface 130 includes regions 132 (e.g. sections) that are flat in at least one direction, with steps 136 between the regions 132. These regions reflect the light form the sources 110 to the pupil 145. As shown, the regions 132 are flat in a direction from right to left. In other words, a cross section of the surface 130 in a plane that is perpendicular to the pupil has regions that are flat. As user herein, the term "flat" means that as one moves in a particular direction along the surface in the region, a direction of the movement does not change (e.g. curve up or down) on a macroscopic scale, i.e. larger than minor chips in the surface.

In one embodiment, the regions are curved in a direction perpendicular to the cross section shown, i.e. in the direction out of the paper. In another embodiment, the regions 132 are flat in the direction perpendicular to the cross section. In one aspect, the regions may have steps in this direction perpendicular to the cross section.

The regions 132 advantageously have different angles relative to the line 142. For example, a region farther from the pupil 145 has an angle that is larger than the angle for a region closer to the pupil 145. In this manner, a region 132a farther from the pupil 145 can be situated higher than a top edge of the pupil 145, but still reflect light into the pupil 145. Also, a region closer to the pupil 145 can reflect light into a different location within the pupil 145 than region 132 does, without reflecting light into the lower half of the pupil 145.

In one embodiment, the angle for each region increases as the distance to the pupil becomes shorter. For instance, the region closest to the pupil may have a 45° with the line 142. The region would thus reflect light horizontal to line 142. The angle for the farthest respective region may have the largest angle and reflect light to the lowest or highest point on the pupil. The angle larger than 45° allows the region to be located below the lowest point of the pupil 145, but still reflect light into the pupil 145. In one aspect, almost all of the reflected light can be received by the pupil 145 and still have a relatively homogeneous light distribution.

Such embodiments have advantages over other arrangements or structures. For example, as shown, the height of the pupil 145 is smaller than the total height of the two surfaces 130 combined. If the surface 130 had a single flat region having one angle (e.g. 45 degrees), then the light incident on the far edges of the surface 130 would not reflect into the pupil 145. Although it may be possible to use a different angle than 45° to reflect light from the outer edges of single surfaces in this inferior arrangement, an uneven brightness in the image would result.

After light is received by the pupil 145, the imager 140 uses the light to create an image, e.g. by modulating different parts (potentially for different colors or wavelengths) corresponding to different pixels of an image. The modulated light (i.e. the image) is then sent to a projection lens 150, which is configured to project the image onto an external surface to create the projected image 190.

In some embodiments, more than two light sources may be used. For example, two other light sources may provide light in a perpendicular direction to the light sources shown. These light sources may be directly above and below the reflective surfaces 130. In this embodiment, two other reflective surfaces would also be used.

Figure 2:
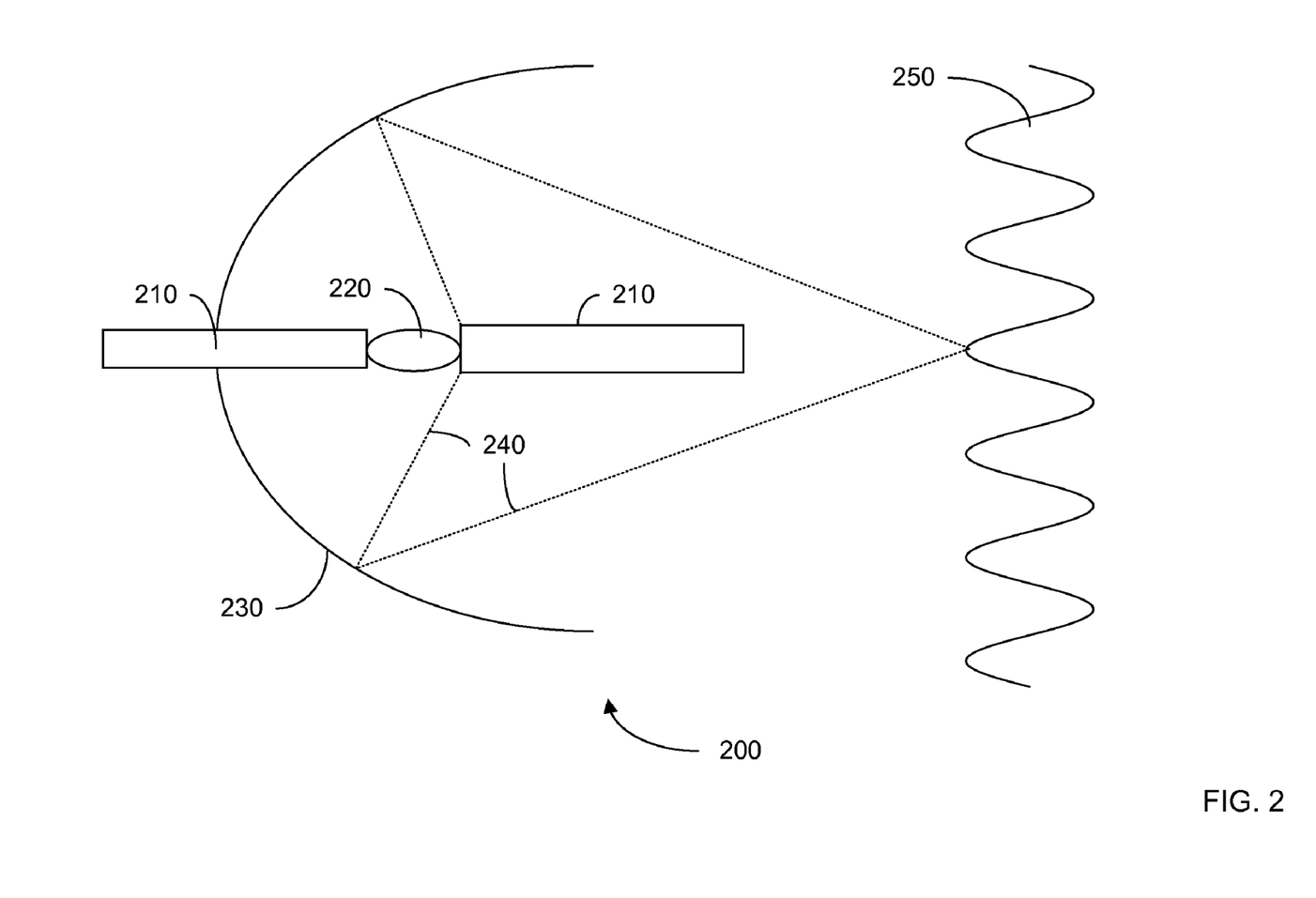
FIG. 2 illustrates a lamp 200 that may be used as a light source and a resulting light intensity pattern according to an embodiment of the present invention.

FIG. 2 illustrates a lamp 200 that may be used as a light source and a resulting light intensity pattern 250 according to an embodiment of the present invention. As depicted, the lamp 200 is an arc lamp, although other lamps may be used in other embodiments of the invention. Types of arc lamps include ultra-high performance or ultra-high pressure (UHP) lamps (e.g. containing Mercury), as well as other lamps that have a short arc gap. Exemplary arc-gaps are from 0.7 mm-1.5 mm with a wattage of between 120-500 W.

Electrodes 210 produce electric discharges (arcs) 220. These arcs 220 emit light rays 240. Typically, these light rays 240 are emitted generally in all directions. A reflector 230 is used to focus the rays 240 to provide a more concentrated beam of light. Given that the arc 220 is not a perfect point of light, the rays 240 reflected from the reflector 240 will travel different distances and a diffraction (intensity) node pattern 250 results. Thus, different points will have different intensities.

In some embodiments, other node patterns may be created via other mechanisms. For example, a node pattern may be created from a uniform pattern, which has already been compressed. This new node pattern may then be compressed again to create the light at pupil 145. In this manner, a multi-level compression mechanism may be achieved. In one embodiment, each light source could include reflective light surfaces 230 to perform a first level of compression, or compression for any subsequent or prior level of compression.

Embodiments account for this resulting intensity node pattern to achieve greater efficiency. In one embodiment, the flat regions 132 are aligned with the high intensity nodes so that an optimal amount of light is reflected into pupil 145.

Figure 3:
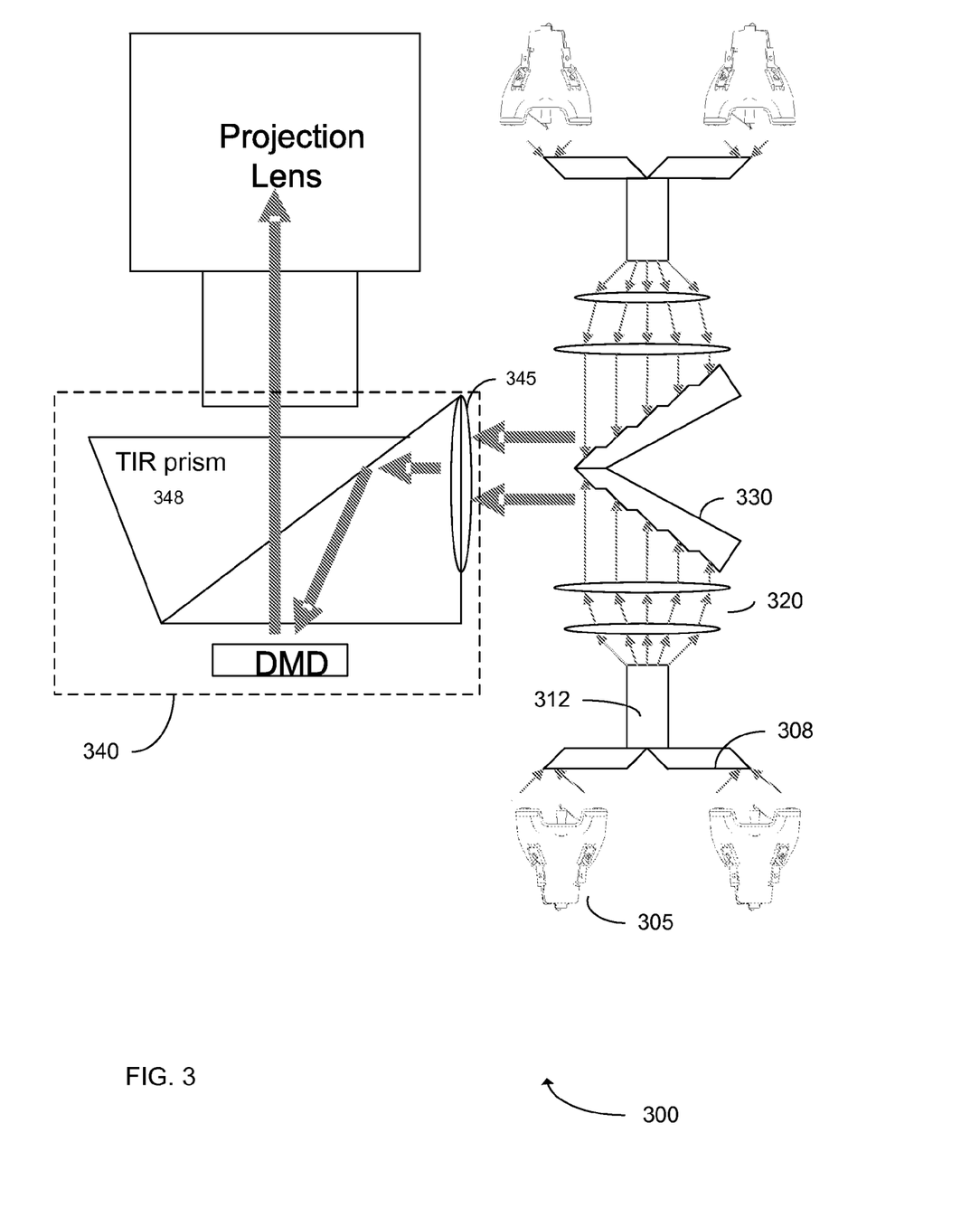
FIG. 3 is a schematic diagram of an image projector 300 according to an embodiment of the present invention.

FIG. 3 is a schematic diagram of an image projector 300 according to an embodiment of the present invention. In this embodiment, each light source described in FIG. 1 is composed of two lamps 305. Thus, in general, the illumination for image projector 300 includes four lamps; however, each light source may be made of any number of lamps.

Each lamp 305 is positioned to transmit light into respective light guides 308 (also called an integrator) that are each optically connected to a collective light guide 312. The optical connection may be accomplished in any number of ways, e.g., via methods described in the Andersen patent, referenced above.

As shown, the two lamps 305 of each light source are in parallel configuration, which allows the lamps to be rotated around its own axis. In other embodiments, the lamps are in other configurations. In one embodiment, the lamp 305 needs to burn and emit light in a horizontal direction within about +/−20 degrees from normal because a vertical burning direction would reduce lamp lifetime significant, e.g., due to burn back of the electrodes.

The lamps 305 have a focus point close to the light guides 308. In one embodiment, the light guide are solid and act as an integrator of the light. In one aspect, the surface of the light guides 308 at which the focus point is located is anti-reflection (AR) coated to reduce the level of back reflection in the transition between air and the surface (e.g. the glass of the light guide).

The light in the integrator 308 is reflected by an angled mirror surface (e.g. 45°) coated directly on the light integrator. The light is then reflected again in the solid light integrator on an angled (e.g. 45°) mirror coated surface on another end of the solid light integrator. The exit side of the light integrator 308 is AR coated to achieve maximum light transmission in the transition between glass and air.

The light travels from the solid light integrator 308 to the collection light integrator 312. In one embodiment, the collection light integrator is of a hollow type, e.g., where 4 pieces of surface mirrors are glued together and form a hollow light tunnel. In one aspect, the cross section of the collecting light integrator 312 has similar format as the final image. As user herein the term "format" refers to an aspect ration of the sides of the image, for example, 16:9, 4:3, etc. In another aspect, the entrance cross section of the integrator 312 is twice the length of the exit cross section of the solid light integrators 308.

In one embodiment, the collecting light integrator 312 has a length such that the light is uniformly integrated by multiple reflections from the collecting light integrator mirror surfaces. Ideally, the exit cross section of the collecting light integrator 312 should be free of chips from the mirror surface or any dust from the edge that will be focused into the imager 340. Any dust or chips on this cross section will be visible on a focused image from the projector 300.

The light are then collected into relay lenses 320 with diameter big enough to collect all (or almost all) of the light energy from the lamps 305, and focus the light intensity node pattern from the light integrators onto the reflective surfaces 330 (e.g. a stepped mirror surface). The light intensity node pattern on the surfaces 330 is a virtual mapping of the light spots from the light integrators 308 entrance. In one embodiment, the solid light integrators 308 for the depicted parallel position lamp have a same cross section and length to beneficially create a node pattern with well defined maximums and minimums. In one aspect, if the integrators do not have a same cross section the node pattern may be destroyed.

Figure 4:
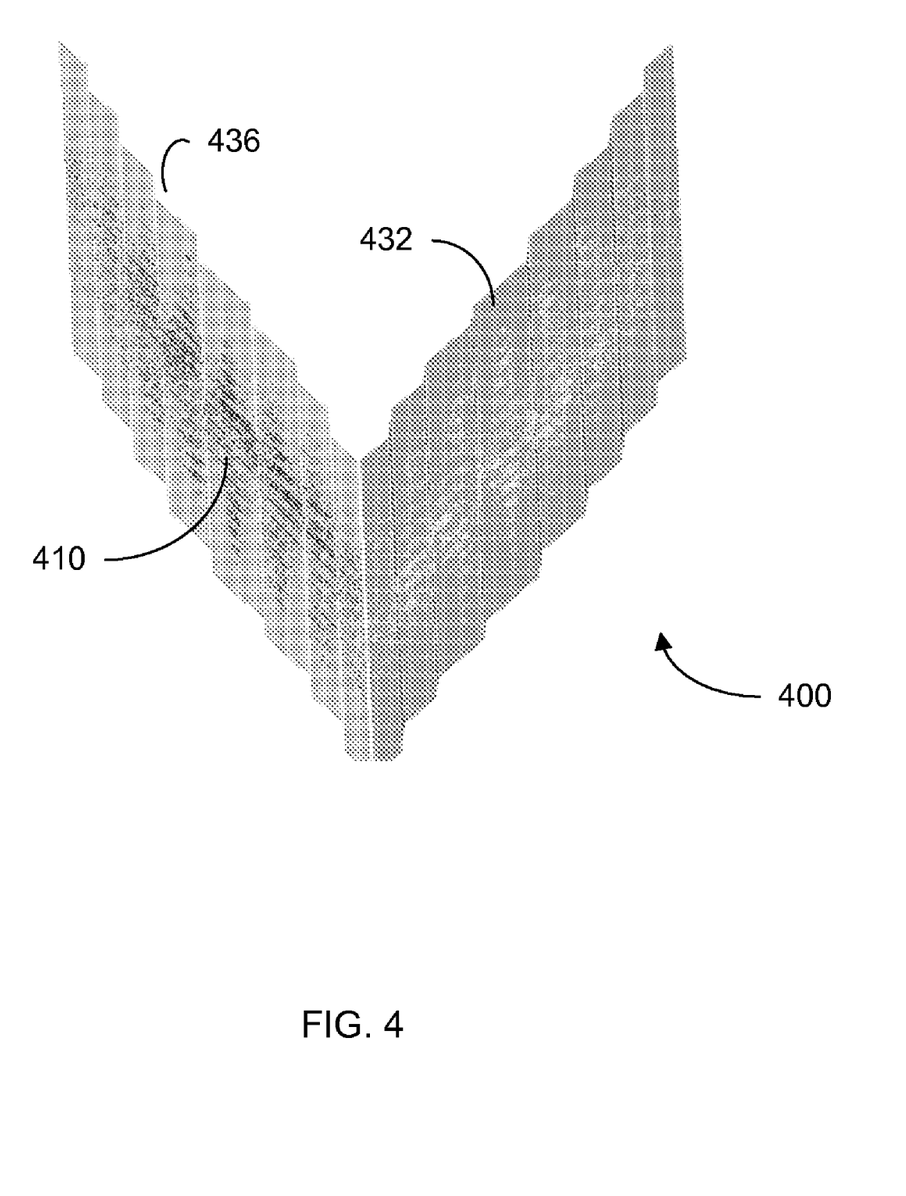
FIG. 4 is a simulation plot of the light intensity node pattern 410 focused on the stepped mirror 400, where the mirror steps are matched with the created light intensity node pattern according to an embodiment of the present invention.

FIG. 4 is a simulation plot of the light intensity node pattern 410 focused on the stepped mirror 400, where the mirror steps are matched with the created light intensity node pattern according to an embodiment of the present invention. As shown, the node patterns shows peaks as one moves from left to right. The highest peak shown roughly corresponds to the center of the mirror. Additionally, peaks can be seen as one moves up and down from a middle of the mirror.

In one aspect, the flat regions 432 are located at or near the peaks, and the steps 436 are located at or near the minimums of the node pattern. This configuration is able to reflect almost all of the light. For example, in one embodiment, about 90%-95%. In one embodiment, the steps are not reflective, for instance, because very little light is received by them.

Therefore, referring back to FIG. 3, each stepped mirror surface 330 compresses the illumination of the entrance pupil to about 50% from each stepped mirror unit. Thus, by designing a stepped mirror 330 where each mirror surface has a dimension and an angle matched to reflect the light intensity node pattern into the pupil 345, all (or almost all) of the light energy from a light source illuminates approximately 50% of the pupil 345.

As shown, the pupil 345 is a lens that is attached to a total internal reflection (TIR) prism 348 where the surface of the lens is AR coated and the lens is glued, aligned and fixed in x-y-z position to the TIR prism 348. In one embodiment, the TIR prism 348 is a 2 glass block component where there is air gap between the glass substrates of typical 5-25 micron meter. The light is reflected in the TIR surface and illuminates the digital micromirror device (DMD) 342 from Texas Instrument, US, or other imaging device.

A DMD is a mirror device that consists of a pixel matrix of mirror tilted, e.g., +/−12 degrees to obtain an On/Off state. The DMD reflects the light into the projection lens when the DMD is ON position. In one embodiment, to avoid any reflections into the projection lens, the DMD reflects the light in a dump light area of the optical engine when the DMD is in Off position. Such reflection can reduce the contrast of the projected image.

Compression of light from a light source by a stepped mirror is now further described, particularly with regard to the location of the steps.

Figure 5:
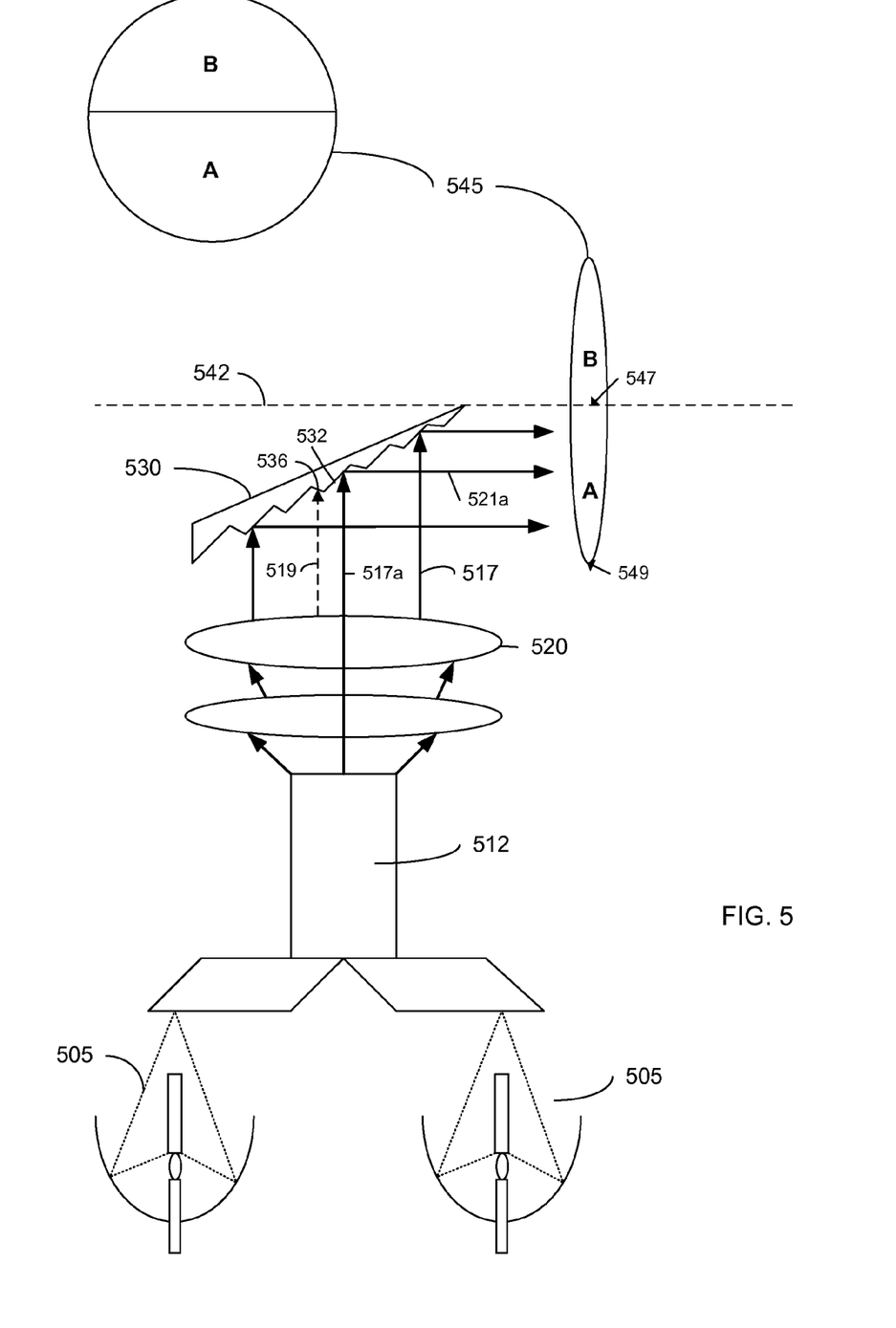
FIG. 5 shows a schematic diagram of part of an image projector according to an embodiment of the present invention.

FIG. 5 shows a schematic diagram of part of an image projector according to an embodiment of the present invention. Two lamps 505 are shown in one illumination axis. The stepped mirror 530 compresses the illumination from the lamps 505 to only illuminate 50% of the entrance pupil 545 of an imager. In one aspect, such compression can effectively double the light intensity for the area of the pupil 545.

As shown, the solid rays 517 correspond to peaks in a light intensity node pattern provided from collective light guide 512. The mirrors 532 are located so that the solid rays 517 (i.e. the peaks) are reflected to the pupil 545. The dashed rays 519 signify any light rays that are at the minimums in the node pattern. The rays 519 are incident on the stepped mirror at steps 536, which do not reflect the rays 519 to the pupil 545. However, as few of the rays 519 exist, the stepped mirror 530 can accomplish compressing most of the illumination to half (half A as shown) of the pupil 545.

The steps 519 occur so that different mirror regions 532 can have their angle with line 542 adjusted to appropriate values in order to compress the illumination to half A of the pupil 545. Ideally, the change from one mirror to another is as short as possible. Accordingly, in one embodiment, a step has a surface with an orientation within a range of 90 degrees from perpendicular to the received EM radiation to parallel to the EM radiation with the surface facing away from the pupil 545. In other words, the step 536 is horizontal, vertical (face to the left), or somewhere in between.

Additionally, in one embodiment, the mirrors 532 may be curved in a direction perpendicular (i.e. transverse—out of the paper) to the cross section shown. In another embodiment, there are different mirror sections in the transverse direction. These embodiments may provide a greater illumination as follows.

As shown, the central ray 517a is transformed into the ray 521a that is received by the pupil 545. The ray 517a occurs at the greatest height of the relay lens 520 (i.e. from top to bottom of the relay lens 520). However, the ray 521a occurs at a point between the middle 547 and the narrow end 549 of the pupil lens 545. Thus, the height at this point may be less than the height of the relay lends 520 at its middle. Accordingly, embodiments compress the ray 517a in the vertical direction (i.e. in direction into/out of the paper).

To compress the illumination in this direction, a similar mechanism as the compression in the other direction (as described above) may be used. For example, a greater angle from a plane perpendicular to the cross-section shown may be used for regions of a mirror that correspond to the top and the bottom of the relay lens 520. As another example, mirror regions that are above a central plane perpendicular to the pupil are tilted so that an angle between a respective region and the central plane is less than 90 degrees. The central plane cuts the pupil in half. The central plane would be a horizontal plane, i.e. in the same plane as the cross-section shown. This titled mirror region would reflect the light with a component in a downward direction so that the light would be compressed. Similarly, a mirror region below the central plane would reflect light upwards.

As mentioned above, different lamp configurations may be used as a light source. Examples of other configurations are as follows.

Figure 6A:
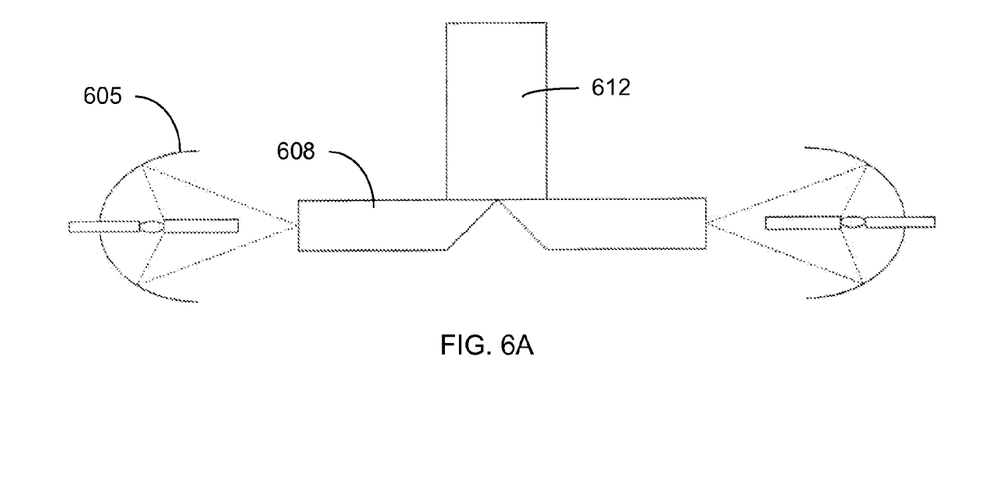
FIGS. 6A and 6B show alternative configurations for lamps of light sources according to embodiments of the present invention.
Figure 6B:
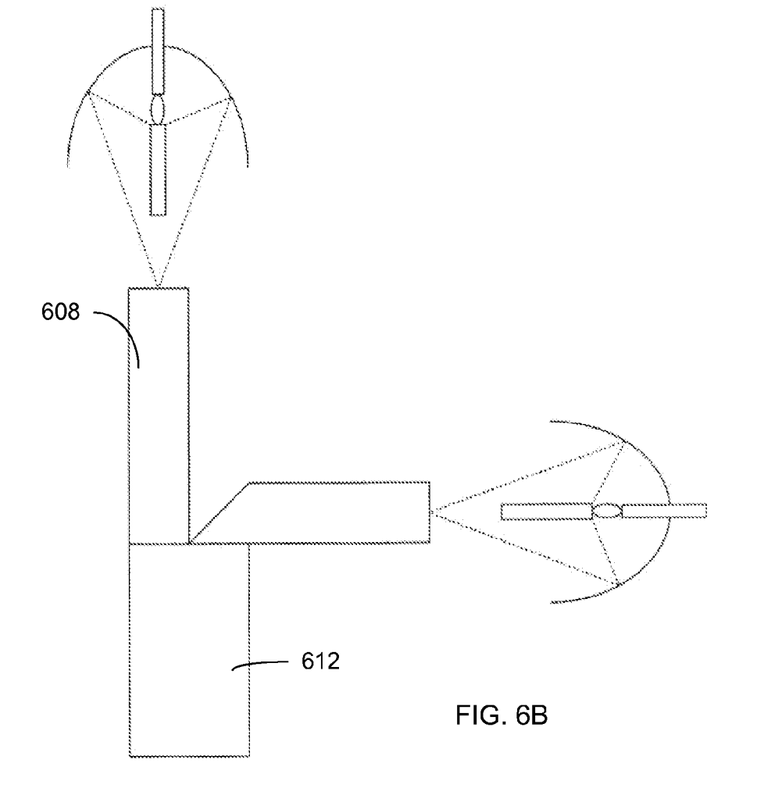

FIGS. 6A and 6B show alternative configurations for lamps of light sources according to an embodiment of the present invention. In FIG. 6A, the lamps 605 provide light in opposing directions into light guides 608, which are also in opposing directions. These light guides then transmit the light into a collective light guide 612. In FIG. 6B, the lamps provide light in perpendicular directions to the light guides 608, which are also perpendicular to each other. These light guides also then transmit the light into a collective light guide 612. In other embodiments, different configurations may be combined to provide light sources with more than two lamps, e.g. combining these two configurations so that 3 lamps are used.

Embodiments also provide modulation of different colors of the light sources.

Figure 7:
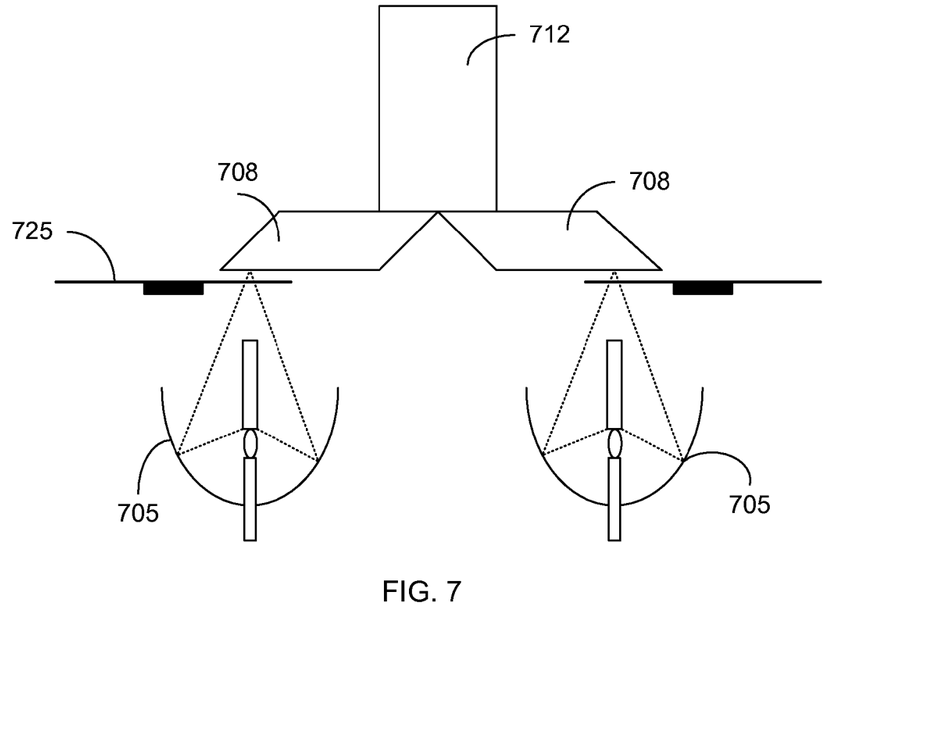
FIG. 7 shows a color modulator placed between a lamp and a light integrator according to an embodiment of the present invention.

FIG. 7 shows a color modulator 725 placed between a lamp 705 and a light integrator 708 according to an embodiment of the present invention. In one aspect, the color modulator 725 is close or at a focus point of the reflector of the lamp. The color modulators 725 operate to filter certain wavelengths (or colors) of a light source. Such operation is further described in the Andersen patent, referenced above. In one embodiment, each lamp 705 has its own color modulator, which are synchronized to each other during operation.

Figure 8A:
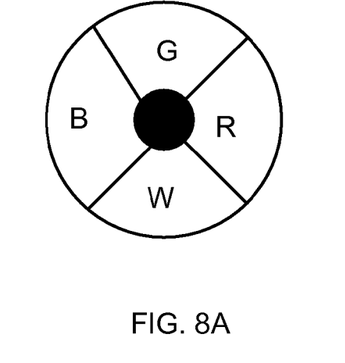
FIG. 8A shows a color wheel with a four color segment configuration (Red, Green, Blue and White) according to an embodiment of the present invention.

FIG. 8A shows a color wheel with 4 segments, shows here by Red, Green, Blue and White, according to an embodiment of the present invention. The sequence of the colors can vary, and are not be limited strictly to combinations or ordering of R,G,B; W or R,G,B.

Figure 8B:
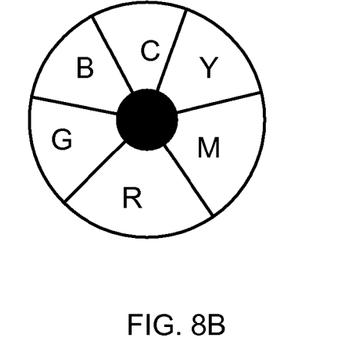
FIG. 8B shows a color wheel with primary colors (Red, Green, Blue) and secondary colors (Cyan, Magenta and Yellow) according to an embodiment of the present invention.

FIG. 8B shows a color wheel with primary colors (R,G,B) and secondary colors (Cyan, Magenta and Yellow) according to an embodiment of the present invention. The sequence of the color can be any and are not limited to use of Cyan, Magenta and Yellow as the specific secondary colors.

The description above has been focused on single display systems; however, embodiments may also be used with multiple display systems, or in non display solutions.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An image projection system comprising:
    two sources that each provide electromagnetic (EM) radiation, wherein the sources provide EM radiation in opposing directions;
    a first reflective surface that reflects EM radiation from the first source
    a second reflective surface that reflects EM radiation from the second source;
    an imager that has a pupil for receiving the reflected EM radiation and that uses the received EM radiation to create an image, wherein a first half of the pupil receives reflected EM radiation from the first source, and a second half of the pupil receives reflected EM radiation from the second source,
    wherein each reflective surface includes a plurality of regions that are flat in at least one direction, wherein a first region of each reflective surface has a smaller angle relative to a line perpendicular to the pupil than does a second region of each reflective surface, and wherein each first region is closer to the pupil than each second region, wherein the plurality of regions is disposed based on an intensity node pattern of at least one of the first or second sources.

2. The image projection system of claim 1, wherein the regions are flat in a direction within a plane that is perpendicular to the pupil.

3. The image projection system of claim 1, wherein each source includes:
    two lamps that transmit EM radiation into a collective guide; and
    one or more relay lenses that focus the EM radiation into parallel rays.

4. The image projection system of claim 3, wherein for each source:
    a first lamp transmits EM radiation to a first guide; and
    a second lamp transmits EM radiation to a second guide, wherein EM radiation from the first guide and the second guide are transmitted into the collective guide.

5. The image projection system of claim 1, wherein for each reflective surface:
    an angle between respective regions and a line perpendicular to the pupil successively decreases as a distance between a region and the pupil decreases.

6. The image projection system of claim 1, wherein for each reflective surface:
the region closest to the pupil has an angle relative to a line perpendicular to the pupil, wherein the angle has a value of 45 degrees.

7. The image projection system of claim 1, wherein for each reflective surface:
regions that are above a central plane perpendicular to the pupil are tilted so that an angle between a respective region and the central plane is less than 90 degrees, whereby a respective region above the central plane reflects EM radiation with a component in a downward direction.

8. The image projection system of claim 1, wherein each reflective surface further includes:
a plurality of steps, each step between successive flat regions along a direction towards the pupil.

9. The image projection system of claim 8, wherein a step has a surface with an orientation within a range of 90 degrees from perpendicular to the received EM radiation to parallel to the EM radiation with the surface facing away from the pupil.

10. The image projection system of claim 8, wherein the steps are not reflective.

11. The image projection system of claim 8, wherein the steps are located at minimum intensity nodes of the EM radiation along at least one direction.

12. The image projection system of claim 1, wherein the pupil is a lens that maps the received EM radiation onto an image source.

13. The image projection system of claim 1, further comprising:
a projection lens that receives the image and projects the image onto an external surface.

14. A method of creating an image, the method comprising:
providing, with two sources, electromagnetic (EM) radiation, wherein the sources provide EM radiation in opposing directions;
reflecting, with a first reflective surface, EM radiation from the first source;
reflecting, with a second reflective surface, EM radiation from the second source;
receiving, at a first half of a pupil of an imager, EM radiation reflected from the first reflective surface;
receiving, at a second half of the pupil, EM radiation reflected from the second reflective surface; and
creating an image with the imager by using the received EM radiation,
wherein each reflective surface includes a plurality of regions that are flat in at least one direction, and wherein reflecting EM radiation from the sources includes:
reflecting EM radiation from a first region of each reflective surface with a first angle relative to a line perpendicular to the pupil;
reflecting EM radiation from a second region of each reflective surface with a second angle relative to a line perpendicular to the pupil, wherein each first region is closer to the pupil than each second region, and wherein the first angle is smaller than the second angle, wherein the plurality of regions is disposed based on an intensity node pattern of at least one of the first or second sources.

15. The method of claim 14, wherein providing the EM radiation from each source includes:
transmitting EM radiation from two lamps into a collective guide; and
focusing the EM radiation into parallel rays using one or more relay lenses.

16. The method of claim 15, wherein transmitting EM radiation from two lamps into a collective guide includes:
transmitting, from a first lamp, EM radiation to a first guide;
transmitting, from a second lamp, EM radiation to a second guide, wherein EM radiation from the first guide and the second guide are transmitted into the collective guide.

17. The method of claim 14, wherein reflecting EM radiation from each source includes:
reflecting light from regions successively closer to the pupil at successively smaller angles relative to a line perpendicular to the pupil.

18. The method of claim 14, wherein reflecting EM radiation from each source includes:
reflecting, from the region closest to the pupil, EM radiation at an angle of 45 degrees relative to a line perpendicular to the pupil.

19. The method of claim 14, wherein reflecting EM radiation from each source includes:
from respective regions that are above a central plane perpendicular to the pupil, reflecting EM radiation downward at respective angles relative to the central plane, wherein each respective angle is less than 90 degrees.

20. The method of claim 19, wherein the respective angles relative to the central plane decrease the farther a region is from the central plane.

21. A method of creating an image, the method comprising:
providing, with two sources, electromagnetic (EM) radiation, wherein the sources provide EM radiation in opposing directions;
reflecting, with a first reflective surface, EM radiation from the first source;
reflecting, with a second reflective surface, EM radiation from the second source;
receiving, at a first half of a pupil of an imager, EM radiation reflected from the first reflective surface;
receiving, at a second half of the pupil, EM radiation reflected from the second reflective surface; and
creating an image with the imager by using the received EM radiation,
wherein each reflective surface includes a plurality of regions that are flat in at least one direction, and wherein reflecting EM radiation from the sources includes:
reflecting EM radiation from a first region of each reflective surface with a first angle relative to a line perpendicular to the pupil;
reflecting EM radiation from a second region of each reflective surface with a second angle relative to a line perpendicular to the pupil, wherein each first region is closer to the pupil than each second region, and wherein the first angle is smaller than the second angle,
wherein the provided EM radiation has a node pattern of maxima and minima, and wherein minima along at least one direction are located at respective steps between successive flat regions.

22. The method of claim 14, further comprising:
transmitting the image to a projection lens; and
projecting the image from the projection lens onto an external surface.

23. The image projection system of claim 1 wherein the opposing directions are disposed 180 degrees relative to one another.

24. The image projection system of claim 23 wherein the opposing directions are perpendicular to the line perpendicular to the pupil.

25. The method of claim 1 wherein the opposing directions are disposed 180 degrees relative to one another.

26. The method of claim 25 wherein the opposing directions are perpendicular to the line perpendicular to the pupil.

* * * * *

UNITED STATES PATENT AND TRADEMARK OFFICE
CERTIFICATE OF CORRECTION

PATENT NO. : 8,235,536 B2
APPLICATION NO. : 12/266384
DATED : August 7, 2012
INVENTOR(S) : Odd Ragnar Andersen et al.

Page 1 of 1

It is certified that error appears in the above-identified patent and that said Letters Patent is hereby corrected as shown below:

In column 8, claim 1, line 31, after "source" insert --;--;
In column 10, claim 23, line 55, after "1" insert --,--;
In column 10, claim 24, line 58, after "23" insert --,--;
In column 10, claim 25, line 61, delete "1" and insert --14,--;
In column 10, claim 26, line 63, after "25" insert --,--.

Signed and Sealed this
Fourth Day of December, 2012

David J. Kappos
*Director of the United States Patent and Trademark Office*